(12) United States Patent
Meng

(10) Patent No.: US 11,816,915 B2
(45) Date of Patent: Nov. 14, 2023

(54) HUMAN BODY THREE-DIMENSIONAL KEY POINT DETECTION METHOD, MODEL TRAINING METHOD AND RELATED DEVICES

(71) Applicant: Beijing Baidu Netcom Science and Technology Co., Ltd., Beijing (CN)

(72) Inventor: Qingyue Meng, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 192 days.

(21) Appl. No.: 17/352,767

(22) Filed: Jun. 21, 2021

(65) Prior Publication Data

US 2021/0312171 A1   Oct. 7, 2021

(30) Foreign Application Priority Data

Nov. 9, 2020   (CN) .......................... 202011238135.3

(51) Int. Cl.
 *G06V 40/00*   (2022.01)
 *G06V 40/10*   (2022.01)
 (Continued)

(52) U.S. Cl.
 CPC .......... *G06V 40/103* (2022.01); *G06F 18/214* (2023.01); *G06T 5/50* (2013.01); *G06T 7/70* (2017.01); *G06V 10/764* (2022.01)

(58) Field of Classification Search
 CPC .. G06V 40/103; G06V 10/764; G06F 18/214; G06F 18/2413; G06T 5/50; G06T 7/70;
 (Continued)

(56) References Cited

U.S. PATENT DOCUMENTS 10,853,970 B1 * 12/2020 Akbas .................. G06T 1/0007
2021/0049395 A1 * 2/2021 Peng ..................... G06V 10/82
(Continued)

FOREIGN PATENT DOCUMENTS

CN   110516643 A   11/2019
CN   110991319 A   4/2020
CN   111402228 A   7/2020

OTHER PUBLICATIONS

Coarse-To-Fine Volumetric Prediction for Single-Image 3D Human Pose Georgios Pavlakos, Xiaowei Zhou, Konstantinos G. Derpanis, Kostas Daniilidis; Proceedings of the IEEE Conference on Computer Vision and Pattern Recognition (CVPR), 2017, pp. 7025-7034 (Obtained from IDS) (Year: 2017).*
(Continued)

*Primary Examiner* — Oneal R Mistry
*Assistant Examiner* — Vaisali Rao Koppolu
(74) *Attorney, Agent, or Firm* — Quinn IP Law

(57) ABSTRACT

The human body 3D key point detection method includes: acquiring a to-be-detected image, the to-be-detected image including first human body image data; inputting the to-be-detected image into a key point extraction model to acquire N first 3D heatmaps of N human body 3D key points in the first human body image data, each first 3D heatmap representing a Gaussian distribution of one human body 3D key point in first human body image data in a predetermined space, where N is a positive integer; and determining coordinate information about the N human body 3D key points in the first human body image data based on the N first 3D heatmaps.

12 Claims, 4 Drawing Sheets

(51) Int. Cl.
*G06T 7/70* (2017.01)
*G06T 5/50* (2006.01)
*G06F 18/214* (2023.01)
*G06V 10/764* (2022.01)

(58) Field of Classification Search
CPC ......... G06T 7/0012; G06T 5/009; G06T 7/73; G06T 2200/04; G06T 2207/10012; G06T 2207/20081; G06T 2207/20084; G06T 2207/30196; G06N 3/045; G06N 3/047; G06N 3/08
See application file for complete search history.

(56) References Cited

U.S. PATENT DOCUMENTS

| | | | |
|---|---|---|---|
| 2021/0225000 A1* | 7/2021 | Guo | G06T 7/11 |
| 2021/0248772 A1* | 8/2021 | Iqbal | G06T 7/70 |
| 2021/0279456 A1* | 9/2021 | Luo | G06V 10/764 |

OTHER PUBLICATIONS

3D Human Motion Capture Based on Neural Network and Triangular Gaussian Point Cloud Qing You, Wenjie Chen, Ye Li 1. School of Automation, Beijing Institute of Technology, Beijing 100081 2. Beijing Institute of Technology Chongqing Innovation Center, Chongqing 401120, China (From IDS) (Year: 2020).*

Qing You et al., 3D Human Motion Capture Based on Neural Network and Triangular Gaussian Point Cloud, Proceedings of the 39th Chinese Control Conference, Jul. 27-29, 2020, pp. 7281-7486, Shenyang, China.

Nozomi Isami et al., A Note on Data Augmentation Method of 3D Pose Estimation for Illustration of Anime Character, ITE Technical Report, vol. 44, No. 6, pp. 123-128, Feb. 2020.

Georgios Pavlakos et al., Coarse-to-Fine Volumetric Prediction for Single-Image 3D Human Pose, 2017 IEEE Conference on Computer Vision and Pattern Recognition, IEEE Computer Society. pp. 1263-1272.

Office Action issued in JP Application No. 2021-145433 dated Oct. 11, 2022.

* cited by examiner

HUMAN BODY THREE-DIMENSIONAL KEY POINT DETECTION METHOD, MODEL TRAINING METHOD AND RELATED DEVICES

CROSS-REFERENCE TO RELATED APPLICATION

This application claims a priority of the Chinese patent application No. 202011238135.3 filed on Nov. 9, 2020, which is incorporated herein by reference in its entirety.

TECHNICAL FIELD

The present application relates to the field of image processing technology, in particular to a computer vision technology and an Augmented Reality (AR) technology, more particularly to a human body three-dimensional (3D) key point detection method, a model training method and related devices.

BACKGROUND

Along with the development of Internet technology and the popularization of human-computer interaction applications, the application of acquiring human body key points becomes more and more valuable. For example, the human body key points probably need to be applied in such fields as motion sensing games, human behavior analysis, and visual figure avatar driving.

A deep learning technology of the human body key points refers to a technology of inputting a human body image, inferring a designated human body key point through a deep leaning model, and outputting the designated human body key point. Currently, the detection of a human body 3D key point usually includes acquiring the human body 3D key point through identifying features of an RGB image using the deep learning model.

SUMMARY

An object of the present disclosure is to provide a human body 3D key point detection method, a model training method and related devices.

In a first aspect, the present disclosure provides in some embodiments a human body 3D key point detection method, including: acquiring a to-be-detected image, the to-be-detected image including first human body image data; inputting the to-be-detected image into a key point extraction model to acquire N first 3D heatmaps of N human body 3D key points in the first human body image data, each first 3D heatmap representing a Gaussian distribution of one human body 3D key point in first human body image data in a predetermined space, where N is a positive integer; and determining coordinate information about the N human body 3D key points in the first human body image data based on the N first 3D heatmaps.

In a second aspect, the present disclosure provides in some embodiments a model training method, including: inputting a to-be-detected image into a key point extraction model and outputting N second 3D heatmaps about N human body 3D key points, a space for each second 3D heatmap being a predetermined space; and with respect to each second 3D heatmap, performing normalization on data about the second 3D heatmap to acquire N first 3D heatmaps.

In a third aspect, the present disclosure provides in some embodiments a human body 3D key point detection device, including: a first acquisition module configured to acquire a to-be-detected image, the to-be-detected image including first human body image data; a first input module configured to input the to-be-detected image into a key point extraction model to acquire N first 3D heatmaps of N human body 3D key points in the first human body image data, each first 3D heatmap representing a Gaussian distribution of one human body 3D key point in the first human body image data in a predetermined space, where N is a positive integer; and a first determination module configured to determine coordinate information about the N human body 3D key points in the first human body image data based on the N first 3D heatmaps.

In a fourth aspect, the present disclosure provides in some embodiments a model training device, including: a second acquisition module configured to acquire a plurality of training images, each training image including second human body image data; a second input module configured to input each training image of the plurality of training images into a key point extraction model to acquire N third 3D heatmaps of N human body 3D key points in the second human body image data, each third 3D heatmap representing a Gaussian distribution of one human body 3D key point in the second human body image data in a predetermined space, where N is a positive integer; a second determination module configured to determine coordinate information about the N human body 3D key points in the second human body image databased on the N third 3D heatmaps; a third determination module configured to determine difference information between the coordinate information about the N human body 3D key points in the second human body image data and coordinate label information corresponding to the second human body image data; and an updating module configured to update the key point extraction model based on the difference information.

In a fifth aspect, the present disclosure provides in some embodiments an electronic device, including at least one processor and a memory in communication with the at least one processor. The memory is configured to store therein an instruction to be executed by the at least one processor. The at least one processor is configured to execute the instruction so as to implement the above-mentioned method in the first aspect or the second aspect.

In a sixth aspect, the present disclosure provides in some embodiments a non-transient computer-readable storage medium storing therein a computer instruction. The computer instruction is executed by a computer so as to implement the above-mentioned method in the first aspect or the second aspect.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
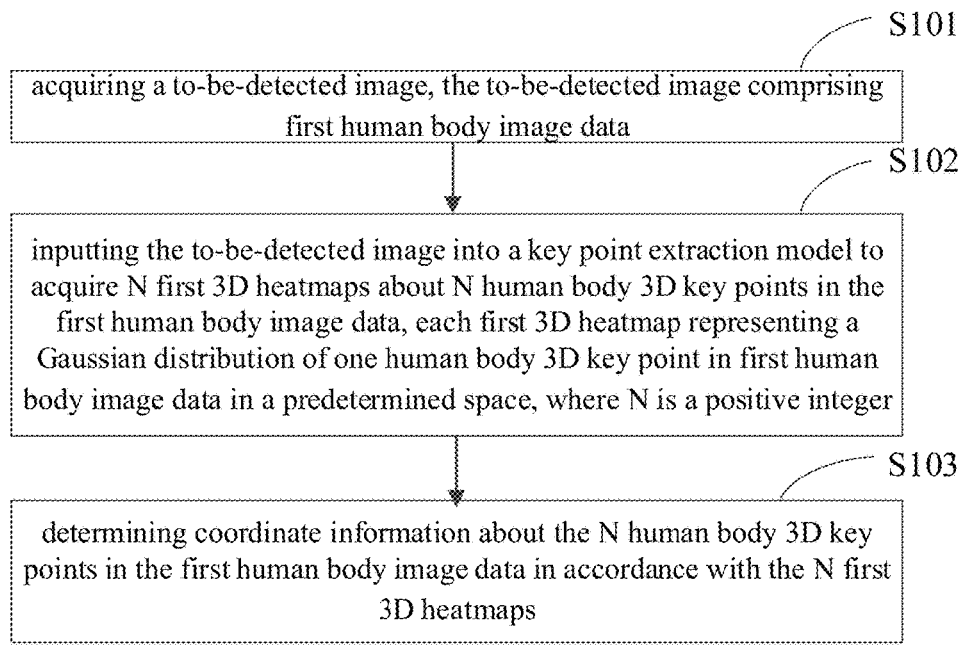
FIG. 1 is a flow chart of a human body 3D key point detection method according to a first embodiment of the present disclosure.

As shown in FIG. 1, the present disclosure provides in this embodiment a human body 3D key point detection method, which includes the following steps.

Step S101: acquiring a to-be-detected image. The to-be-detected image includes first human body image data.

In the first embodiment, the human body 3D key point detection method relates to an image processing technology, in particular to a deep learning technology such as a computer vision technology and an AR technology. It may be widely applied to such scenarios as webcast, fitness supervision and guidance, intelligence education, human behavior analysis, and 3D motion sensing games. The human body 3D key point detection method may be applied to an electronic device, and the electronic device may be a server or a terminal, which will not be particularly defined herein.

The to-be-detected image may be an image collected in real time, a pre-stored image, an image from another device, or an image acquired from the network, which will not be particularly defined herein.

The to-be-detected image may include the first human body image data. The first human body image data may be image data about the entire human body, e.g., it may include image data about the entire human body from head to toe. In addition, the first human body image data may also be image data about a part of the human body, e.g., it may include image data about an upper part of the human body. The first human body image data will not be particularly defined herein. In order to detect human body 3D key points in a relatively complete manner, the following description will be given when the first human body image data is image data about the entire human body.

In addition, the first human body image data may be image data about the human body which is clear, not shielded, and not subjected to such processings as rotation and scaling, or image data about the human body which is shielded, e.g., with a face being shielded, or which is blurred, e.g., with a blurred face, or which is rotated. The first human body image data will not be particularly defined herein.

For example, an image including the human body image data may be collected in real time using a mobile phone or computer, and then the human body 3D key point may be detected in accordance with the image. Alternatively, an image taken previously and including the human body image data may be acquired from a device where the image is stored, and then the human body 3D key point may be detected in accordance with the image. Alternatively, an image including the human body image data may be acquired from the other device, and then the human body 3D key point may be detected in accordance with the image. Of course, an image including the human body image data may also be acquired from the network, and then the human body 3D key point may be detected in accordance with the image.

Step S102: inputting the to-be-detected image into a key point extraction model to acquire N first 3D heatmaps about N human body 3D key points in the first human body image data, each first 3D heatmap representing a Gaussian distribution of one human body 3D key point in the first human body image data in a predetermined space, where N is a positive integer.

In this step, the key point extraction model may be a deep learning model with ResNet as a framework. An input of the key point extraction model may be an image, i.e., the to-be-detected image may be inputted into the key point extraction model, and an output of the key point extraction model may be the N 3D heatmaps about the N human body 3D key points in the first human body image data. Each 3D heatmap may correspond to one human body 3D key point.

The 3D heatmap may represent a distribution of one human body 3D key point in a relative space. For example, with respect to a key point corresponding to a left ankle in the human body image data, the 3D heatmap about the key point may be more likely to be distributed at a lower left corner in the relative space, so a color at this position may be darker than a color at the other positions. The 3D heatmap about the key point may be less likely to be distributed at the other positions, so the color may be relatively lighter.

For another example, with respect to a key point corresponding to a head in the human body image data, the 3D heatmap about the key point may be more likely to be distributed at a top middle position in the relative space, so a color at this position may be darker than a color at the other positions. The 3D heatmap about the key point may be less likely to be distributed at the other positions, so the color may be relatively lighter.

A value of N may be predefined, and it may serve as a parameter of the key point extraction model. When the requirements on hardware and resources have been met, the key point extraction model may output the 3D heatmaps about any quantity of human body 3D key points, e.g., N may be 16, i.e., the key point extraction model may output the 3D heatmaps about 16 human body 3D key points.

In addition, specific positions of the N human body 3D key points in the human body image data may be predefined too. For example, the specific positions of the N human body 3D key points in the human body image data may be a head, left and right wrists, left and right arms, left and right ankles, left and right knees, etc.

The output of the key point extraction model may be, or may not be, a normalized 3D heatmap, which will not be particularly defined herein.

After the to-be-detected image has been inputted into the key point extraction model, the N first 3D heatmaps may be acquired. Each first 3D heatmap may represent a Gaussian distribution of one human body 3D key point corresponding to the first 3D heatmap in the predetermined space, i.e., the first 3D heatmap may be a normalized 3D heatmap for representing a distribution probability of the human body 3D key point in the predetermined space.

In other words, in the case that the 3D heatmap outputted by the key point extraction model is a normalized 3D heatmap, the first 3D heatmap may be acquired directly, and in the case that the 3D heatmap outputted by the key point extraction model is not a normalized 3D heatmap, it is necessary to normalize data in the 3D heatmap outputted by the key point extraction model to acquire the first 3D heatmap.

The predetermined space may also be predefined, and it may also serve as a parameter of the key point extraction model. The key point extraction model may output a 3D heatmap with a constant spatial size. For example, the predetermined space may be 100*100*100, and the key point extraction model may output a 3D heatmap with a constant spatial size of 100*100*100.

Step S103: determining coordinate information about the N human body 3D key points in the first human body image data in accordance with the N first 3D heatmaps.

In this step, each human body 3D key point may correspond to one piece of coordinate information, e.g., coordinates in a space coordinates system. The space coordinates system may be created on the basis of the predetermined space, e.g., a vertex at a lower left corner of the predetermined pace may be taken as an origin to create the space coordinates system.

With respect to each first 3D heatmap, the coordinate information about one human body 3D key point in the first human body image data may be determined, and finally, the coordinate information about the N human body 3D key points in the first human body image data may be acquired.

The coordinate information about the human body 3D key point may be determined in accordance with the first 3D heatmap in various ways. For example, with respect to each coordinate dimension, a coordinate value of each human body 3D key point in the coordinate dimension in accordance with a maximum value of data on a two-dimensional plane corresponding to the coordinate dimension in the first 3D heatmap.

For example, the predetermined space may be 100*100*100, and the space coordinates system may include an X-axis, a Y-axis and a Z-axis. A coordinate dimension in an X-axis direction may include 100 two-dimensional planes determined in accordance with a coordinate dimension in a Y-axis direction and a coordinate dimension in a Z-axis direction, and each two-dimensional plane may include data representing a distribution probability of each human body 3D key point on the two-dimensional plane.

With respect to each two-dimensional plane, a maximum value of data on the two-dimensional plane may be acquired. The maximum value of the data on the two-dimensional plane may represent a maximum distribution probability of the corresponding human body 3D key point on the two-dimensional plane, so the maximum value of the data may serve as a coordinate candidate of the coordinate dimension. Totally 100 coordinate candidates on the coordinate dimension may be acquired.

Finally, a maximum coordinate candidate among the 100 coordinate candidates may be determined as a coordinate value of the human body 3D key point on the coordinate dimension in the X-axis direction. Correspondingly, a calculation mode of a coordinate value of the human body 3D key point on the other coordinate dimension may be similar to that of the coordinate value of the human body 3D key point on the coordinate dimension in the X-axis direction, and thus will not be particularly defined herein.

For another example, with respect to each coordinate dimension, the coordinate value of each human body 3D key point on the coordinate dimension may be determined in accordance with an average of values of the data on the two-dimensional plane corresponding to the coordinate dimension in the first 3D heatmap.

Different from a mode where the coordinate value of the human body 3D key point on the coordinate dimension is determined in accordance with the maximum value of the data on the two-dimensional plane corresponding to the coordinate dimension in the first 3D heatmap, in this mode, the coordinate candidate on the coordinate dimension may be acquired in a different way. To be specific, still taking the coordinate dimension in the X-axis direction as an example, in this mode, the average of the values of the data on the two-dimensional panel corresponding to the coordinate dimension in the first 3D heatmap may be calculated to acquire one coordinate candidate on the coordinate dimension, and finally the coordinate information about the N human body 3D key points may be determined in accordance with the acquired coordinate candidates.

Figure 2:
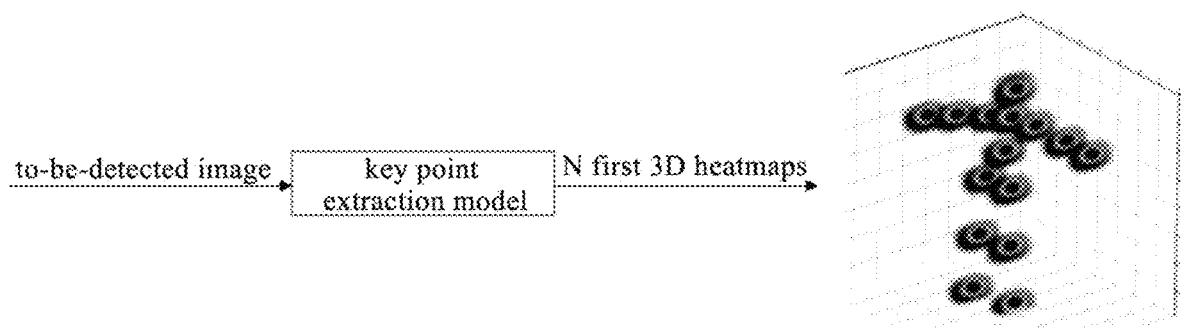
FIG. 2 is a schematic view showing the human body 3D key point detection method according to the first embodiment of the present disclosure.

The human body 3D key point detection method in this embodiment will be described briefly hereinafter. As shown in FIG. 2, after the to-be-detected image has been inputted into the key point extraction model, the N first 3D heatmaps may be acquired, and then the coordinate information about the N human body 3D key points in the first human body image data in the predetermined space may be determined in accordance with the N first 3D heatmaps.

In this embodiment, the distribution probability of each human body 3D key points in the predetermined space may be outputted in the form of a 3D heatmap, and then the human body 3D key point may be determined in accordance with the 3D heatmap, so it is able to prevent the occurrence of an error for the detection of the human body 3D key point caused by an existing deep learning model where 2D coordinate values and depth information are outputted separately, thereby to remarkably improve the accuracy of the human body 3D key point detection.

In addition, in this embodiment, the human body 3D key point may be detected through acquiring merely one to-be-detected image including the human body image data, so it is able to facilitate the deployment and reduce the cost.

In a possible embodiment of the present disclosure, Step S102 may specifically include: inputting the to-be-detected image into the key point extraction model and outputting N second 3D heatmaps about the N human body 3D key points, a space for each second 3D heatmap being the predetermined space; and with respect to each second 3D heatmap, normalizing data in the second 3D heatmap to acquire the N first 3D heatmaps.

During the implementation, non-normalized 3D heatmaps, i.e., the second 3D heatmaps may be outputted by the key point extraction model.

After the acquisition of the second 3D heatmaps, each piece of data in each second 3D heatmap may be normalized through a logistic regression model softmax, so as to acquire a corresponding first 3D heatmap. Of course, the normalization may also be performed through dividing each piece of data in each second 3D heatmap by a maximum value of the data in the second 3D heatmap, which is also feasible.

During the implementation, the second 3D heatmaps may be outputted by the key point extraction model, and with respect to each second 3D heatmap, the data in the second 3D heatmap may be normalized to acquire the N first 3D heatmaps. In this way, it is able to simplify a design of the key point extraction and facilitate the deployment of the model.

In a possible embodiment of the present disclosure, the N human body 3D key points may include a target human body 3D key point. Step S103 may specifically include: with respect to a target coordinate dimension in three coordinate dimensions for the target human body 3D key point, calculating an average of data on a two-dimensional plane corresponding to the target coordinate dimension in a first 3D heatmap corresponding to the target human body 3D key point, so as to acquire a plurality of coordinate candidates for the target coordinate dimension, the two-dimensional plane corresponding to the target coordinate dimension being a plane determined in accordance with two other coordinate dimensions of the three coordinate dimensions; and determining a maximum coordinate candidate in the plurality of coordinate candidates for the target coordinate dimension as a coordinate value of the target human body 3D key point on the target coordinate dimension, the coordinate information about the target human body 3D key point including coordinate values of the target human body 3D key point on the three coordinate dimensions. The target human body 3D key point may be any of the N human body 3D key points, and the target coordinate dimension may be any of the three coordinate dimensions.

During the implementation, the three coordinate dimensions may include the coordinate dimension in the X-axis direction, the coordinate dimension in the Y-axis direction and the coordinate dimension in the Z-axis direction mentioned hereinabove, and the target coordinate dimension may be any of the three coordinate dimensions.

Figure 3:
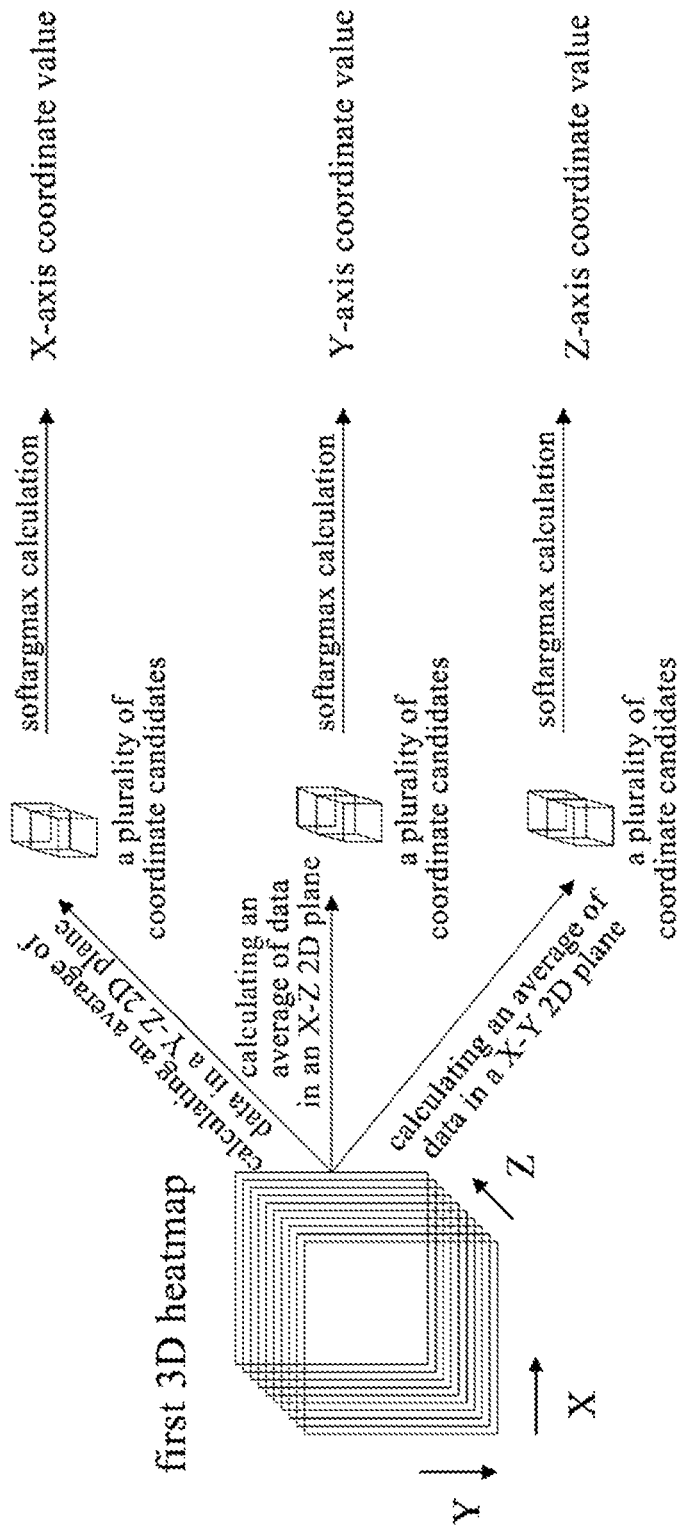
FIG. 3 is a schematic view showing the calculation of coordinates of a human body 3D key point.

As shown in FIG. 3, which shows the calculation of coordinates of the human body 3D key point, with respect to the coordinate dimension in the X-axis direction, an average of values of data may be calculated in each two-dimensional panel determined by the coordinate dimension in the Y-axis direction and the coordinate dimension in the Z-axis direction (a Y-Z two-dimensional plane for short), so as to acquire a plurality of coordinate candidates.

With respect to the coordinate dimension in the Y-axis direction, an average of values of data may be calculated in each two-dimensional panel determined by the coordinate dimension in the X-axis direction and the coordinate dimension in the Z-axis direction (an X-Z two-dimensional plane for short), so as to acquire a plurality of coordinate candidates.

With respect to the coordinate dimension in the Z-axis direction, an average of values of data may be calculated in each two-dimensional panel determined by the coordinate dimension in the X-axis direction and the coordinate dimension in the Y-axis direction (an X-Y two-dimensional plane for short), so as to acquire a plurality of coordinate candidates.

Softargmax calculation may be performed on the plurality of coordinate candidates for each coordinate dimension, so as to determine a maximum coordinate candidate in the plurality of coordinate candidates for each coordinate dimension, thereby to determine the coordinate values on the coordinate dimension in the X-axis direction, the coordinate dimension in the Y-axis and the coordinate dimension in the Z-axis direction. These coordinate values just form the coordinate information about each human body 3D key point.

In this embodiment, with respect to each coordinate dimension, the coordinate value of the human body 3D key point on the coordinate dimension may be determined in accordance with the average of the values of the data on the two-dimensional plane corresponding to the coordinate dimension in each first 3D heatmap, so it is able to improve the calculation accuracy of the human body 3D key point.

Second Embodiment

Figure 4:
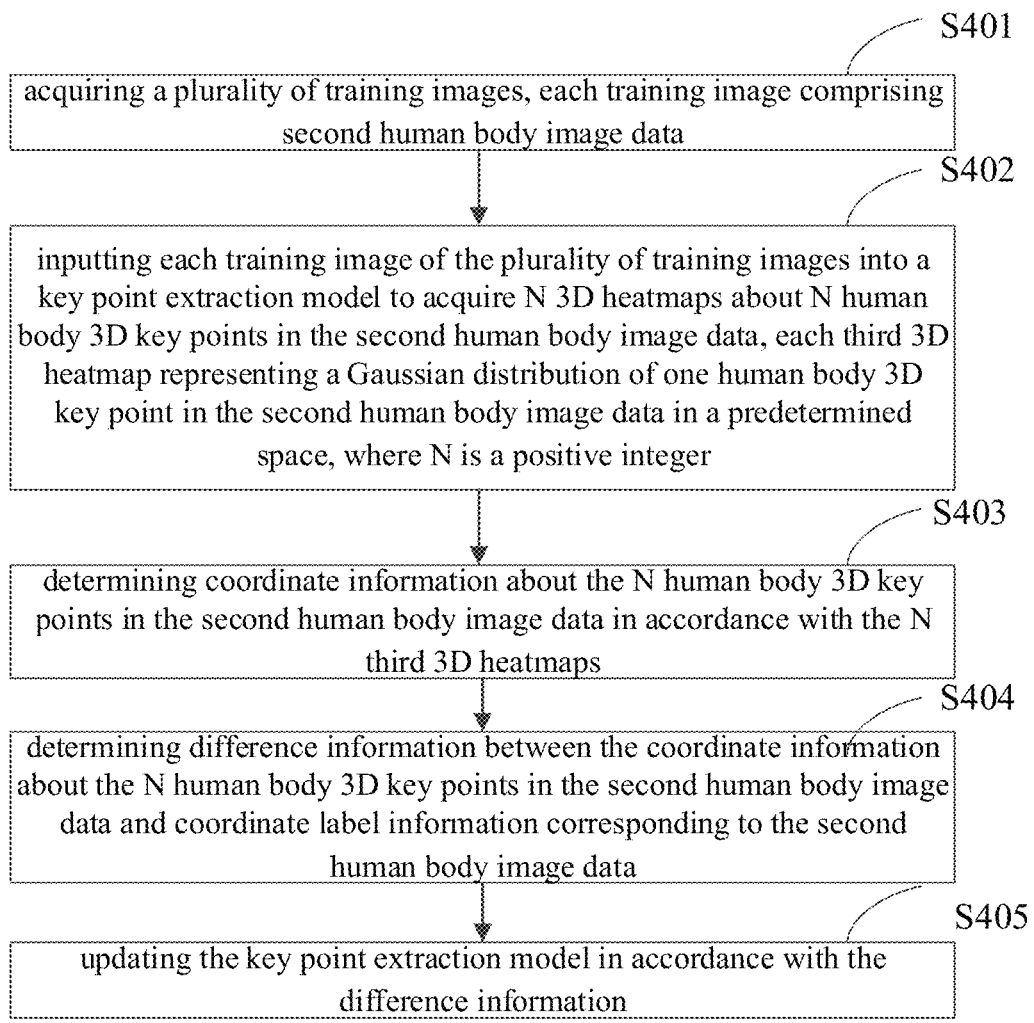
FIG. 4 is a flow chart of a model training method according to a second embodiment of the present disclosure.

As shown in FIG. 4, the present disclosure provides in this embodiment a model training method, which includes: Step S401 of acquiring a plurality of training images, each training image including second human body image data; Step S402 of, with respect to each training image in the plurality of training images, inputting the training image into a key point extracting model so as to acquire N third 3D heatmaps about N human body 3D key points in the second human body image data, each third 3D heatmap representing a Gaussian distribution of one human body 3D key point in the second human body image data in a predetermined space, N being a positive integer; Step S403 of determining coordinate information about the N human body 3D key points in the second human body image data in accordance with the N third 3D heatmaps; Step S404 of determining difference information between the coordinate information about the N human body 3D key points in the second human body image data and coordinate label information corresponding to the second human body image data; and Step S405 of updating the key point extraction model in accordance with the difference information.

In this embodiment, a training procedure of the key point extraction model has been described, so as to enable the key point extraction model to output the 3D heatmap in a more accurate manner.

In Step S401, each training image in the plurality of training images may include the second human body image data. The second human body image data may be image data about the human body which is clear, not shielded, and not subjected to such processings as rotation and scaling, or image data about the human body which is shielded, e.g., with a face being shielded, or which is blurred, e.g., with a blurred face, or which is rotated. The second human body image data will not be particularly defined herein.

It should be appreciated that, the second human bod image data is a same concept as the first human body image data, and they are both used to represent the image data about the human body in an image. The first human body image data may be the human body image data in the to-be-detected image, while the second human body image data may be the human body image data in the training image. In addition, the to-be-detected image may include contents different from the training image. Hence, the first human body image data may be differentiated from the second human body image data herein.

Step S402 may be similar to Step S102 in the first embodiment, Step S403 may be similar to Step S103 in the first embodiment, and thus the two steps will not be particularly defined herein.

The difference lies that, the training image is inputted into the key point extraction model and the N third 3D heatmaps about the N human body 3D key points in the second human body image data may be outputted by the key point extraction model. In addition, same operations may be performed on each training image. The following description will be given by taking one training image as an example.

In Steps S404 and S405, with respect to the second human body image data in each training image, the coordinate label information about the N human body 3D key points in the second human body image data may be acquired in advance.

The coordinate label information may be truth coordinate values of the N human body 3D key points in the second human body image data.

The coordinate information determined in accordance with the N third 3D heatmaps may be compared with the coordinate label information, and the difference information therebetween may be calculated through the following equation for a regression loss function L1 Loss: $Loss_c = \|O_c - G_c\|_1$ (1), where $Loss_c$ represents the difference information between the determined coordinate information and the coordinate label information, $O_c$ represents the determined coordinate information, and $G_c$ represents the coordinate label information.

The difference information may be transmitted back to the key point extraction model, so as to update parameters of the key point extraction model, until the difference information between the coordinate information about the human body 3D key points in the human body image data determined in accordance with the 3D heatmaps outputted by the key point extraction mode and the coordinate label information is converged or minimized. At this time, a training procedure of the key point extraction model has been completed, and the human body 3D key point may be detected through the key point extraction model.

In this embodiment, during the training, the 3D heatmaps may be outputted by the key point extraction model, the coordinate information about the human body 3D key points may be determined in accordance with the 3D heatmaps, and then the difference information between the coordinate information and the coordinate label information may be transmitted back to the key point extraction model, so as to update the parameters of the key point extraction model. As a result, regression learning may be performed directly on the human body 3D key points in the form of the 3D heatmaps, and the key point extraction model may output the distribution probability of each human body 3D key point in the predetermined space, so as to remarkably improve the accuracy of the human body 3D key point detection.

In a possible embodiment of the present disclosure, Step S401 may specifically include: acquiring a plurality of target training images; and performing data enhancement on the plurality of target training images to acquire the plurality of training images.

In this embodiment, each target training image may include image data about the human body which is complete and clear, not shielded, and not subjected to such processings as rotation and scaling.

In order to increase a calculation capability of the key point extraction model, limited image data may be used to simulate more circumstances that may probably occur during the human body 3D key point detection. In this way, it is able to increase a generalization ability of the model, thereby to perform the data enhancement on the plurality of target training images to acquire the plurality of training images.

The data enhancement may be performed on each target training image in terms of color space, random shielding, rotation, mixture background and scaling.

In this way, on one hand, it is able to acquire more training image data, thereby to simulate more circumstances that may probably occur during the human body 3D key point detection using limited image data. On the other hand, it is able to increase the calculation ability of the key point extraction model, thereby to improve the generalization ability of the model.

Third Embodiment

Figure 5:
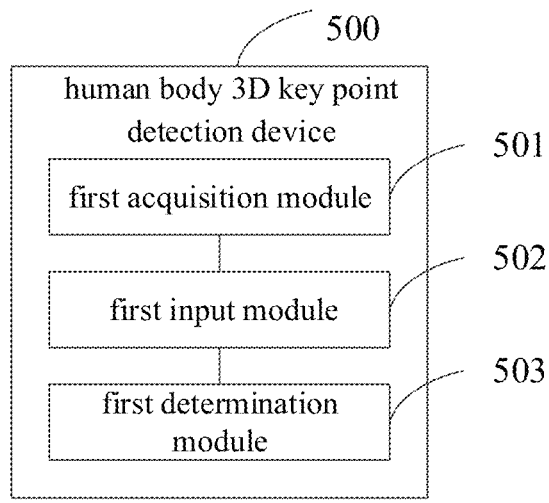
FIG. 5 is a schematic view showing a human body 3D key point detection device according to a third embodiment of the present disclosure.

As shown in FIG. 5, the present disclosure provides in this embodiments a human body 3D key point detection device 500, which includes: a first acquisition module 501 configured to acquire a to-be-detected image, the to-be-detected image including first human body image data; a first input module 502 configured to input the to-be-detected image into a key point extraction model to acquire N first 3D heatmaps about N human body 3D key points in the first human body image data, each first 3D heatmap representing a Gaussian distribution of one human body 3D key point in the first human body image data in a predetermined space, where N is a positive integer; and a first determination module 503 configured to determine coordinate information about the N human body 3D key points in the first human body image data in accordance with the N first 3D heatmaps.

In a possible embodiment of the present disclosure, the first input module 502 may include: an input unit configured to input the to-be-detected image into the key point extraction model so that the key point extraction model outputs N second 3D heatmaps about the N human body 3D key points, a space for each second 3D heatmap being the predetermined space; and a normalization unit configured to, with respect to each second 3D heatmap, normalize data in the second 3D heatmap to acquire the N first 3D heatmaps.

In a possible embodiment of the present disclosure, the N human body 3D key points may include a target human body 3D key point. The first determination module may include: a calculation unit configured to, with respect to a target coordinate dimension in three coordinate dimensions for the target human body 3D key point, calculate an average of values of data on a two-dimensional plane corresponding to the target coordinate dimension in the first 3D heatmap corresponding to the target human body 3D key point, to acquire a plurality of coordinate candidates on the target coordinate dimension, the two-dimensional plane corresponding to the target coordinate dimension being a plane determined in accordance with other two coordinate dimensions in the three coordinate dimensions; and a determination unit configured to determine a maximum coordinate candidate in the plurality of coordinate candidates on the target coordinate dimension as a coordinate value of the target human body 3D key point on the target coordinate dimension, the coordinate information about the target human body 3D key point including coordinate values of the target human body 3D key point on the three coordinate dimensions. The target human body 3D key point may be any human body 3D key point in the N human body 3D key points, and the target coordinate dimension may be any coordinate dimension in the three coordinate dimensions.

In this embodiment of the present disclosure, the human body 3D key point detection device 500 may be used to implement the steps of the above-mentioned human body 3D key point detection method with a same beneficial effect, which will not be particularly defined herein.

Fourth Embodiment

Figure 6:
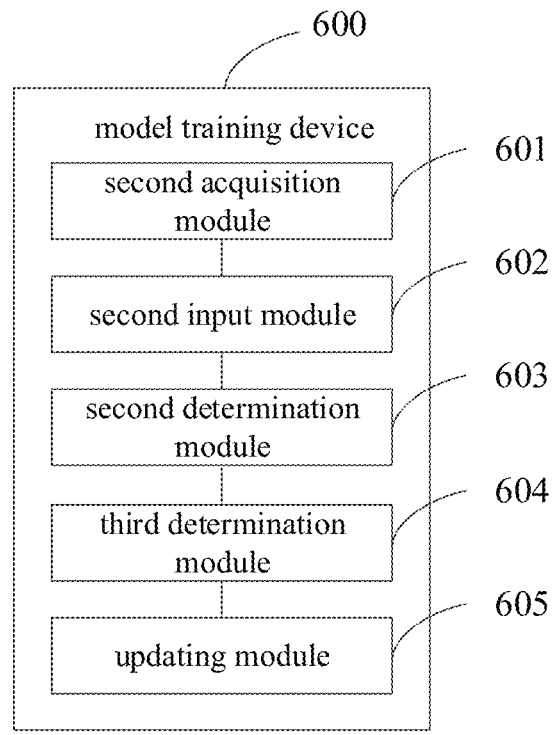
FIG. 6 is a schematic view showing a model training device according to a fourth embodiment of the present disclosure.

As shown in FIG. 6, the present disclosure provides in this embodiment a model training device 600, which includes: a second acquisition module 601 configured to acquire a plurality of training images, each training image including second human body image data; a second input module 602 configured to input each training image of the plurality of training images into a key point extraction model to acquire N third 3D heatmaps about N human body 3D key points in the second human body image data, each third 3D heatmap representing a Gaussian distribution of one human body 3D key point in the second human body image data in a predetermined space, where N is a positive integer; a second determination module 603 configured to determine coordinate information about the N human body 3D key points in the second human body image data in accordance with the N third 3D heatmaps; a third determination module 604 configured to determine difference information between the coordinate information about the N human body 3D key points in the second human body image data and coordinate label information corresponding to the second human body image data; and an updating module 605 configured to update the key point extraction model in accordance with the difference information.

In a possible embodiment of the present disclosure, the second acquisition module 601 may include: an acquisition unit configured to acquire a plurality of target training images; and a data enhancement unit configured to perform data enhancement on the plurality of target training images to acquire the plurality of training images.

In this embodiment of the present disclosure, the model training device 600 may be used to implement the steps of the above-mentioned model training method with a same beneficial effect, which will not be particularly defined herein.

The present disclosure further provides in some embodiments an electronic device and a computer-readable storage medium.

Figure 7:
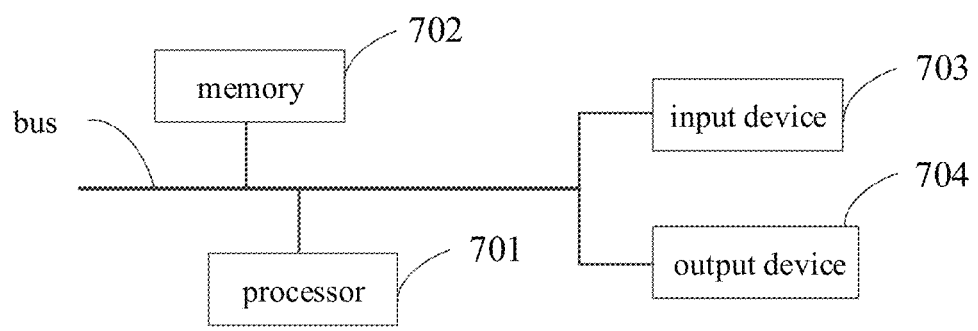
FIG. 7 is a block diagram of an electronic device according to one embodiment of the present disclosure.

FIG. 7 is a schematic block diagram of an exemplary electronic device in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 7, the electronic device may include one or more processors 701, a memory 702, and interfaces for connecting the components. The interfaces may include high-speed interfaces and low-speed interfaces. The components may be interconnected via different buses, and installed on a public motherboard or installed in any other mode according to the practical need. The processor is configured to process instructions to be executed in the electronic device, including instructions stored in the memory and used for displaying graphical user interface (GUI) pattern information on an external input/output device (e.g., a display device coupled to an interface). In some other embodiments of the present disclosure, if necessary, a plurality of processors and/or a plurality of buses may be used together with a plurality of memories. Identically, a plurality of electronic devices may be connected, and each electronic device is configured to perform a part of necessary operations (e.g., as a server array, a group of blade serves, or a multi-processor system). In FIG. 7, one processor 701 is taken as an example.

The memory 702 may be just a non-transient computer-readable storage medium in the embodiments of the present disclosure. The memory is configured to store therein instructions capable of being executed by at least one processor, so as to enable the at least one processor to execute the above-mentioned human body 3D key point detection method or model training method. In the embodiments of the present disclosure, the non-transient computer-readable storage medium is configured to store therein computer instructions, and the computer instructions may be used by a computer to implement the above-mentioned human body 3D key point detection method or model training method.

As a non-transient computer-readable storage medium, the memory 702 may store therein non-transient software programs, non-transient computer-executable programs and modules, e.g., program instructions/modules corresponding to the above-mentioned human body 3D key point detection method (e.g., the first acquisition module 501, the first input module 502 and the first determination module 503 in FIG. 5), or program instructions/modules corresponding to the above-mentioned model training method (e.g., the second acquisition module 601, the second input module 602, the second determination module 603, the third determination module 604 and the updating module 605 in FIG. 6). The processor 701 is configured to execute the non-transient software programs, instructions and modules in the memory 702, so as to execute various functional applications of a server and data processings, i.e., to implement the above-mentioned human body 3D key point detection method or model training method.

The memory 702 may include a program storage area and a data storage area. An operating system and an application desired for at least one function may be stored in the program storage area, and data created in accordance with the use of the electronic device for implementing the event extraction method may be stored in the data storage area. In addition, the memory 702 may include a high-speed random access memory, or a non-transient memory, e.g., at least one magnetic disk memory, a flash memory, or any other non-transient solid-state memory. In some embodiments of the present disclosure, the memory 702 may optionally include memories arranged remotely relative to the processor 701, and these remote memories may be connected to the electronic device for implementing the event extraction method via a network. Examples of the network may include, but not limited to, Internet, Intranet, local area network, mobile communication network or a combination thereof.

The electronic device for implementing the method may further include an input device 703 and an output device 704. The processor 701, the memory 702, the input device 703 and the output device 704 may be connected to each other via a bus or connected in any other way. In FIG. 7, they are connected to each other via the bus.

The input device 703 may receive digital or character information, and generate a key signal input related to user settings and function control of the electronic device for implementing the event extraction method. For example, the input device 703 may be a touch panel, a keypad, a mouse, a trackpad, a touch pad, an indicating rod, one or more mouse buttons, a trackball or a joystick. The output device 704 may include a display device, an auxiliary lighting device (e.g., light-emitting diode (LED)) or a haptic feedback device (e.g., vibration motor (The display device may include, but not limited to, a liquid crystal display (LCD), an LED display or a plasma display. In some embodiments of the present disclosure, the display device may be a touch panel.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

These computer programs (also called as programs, software, software application or codes) may include machine instructions for the programmable processor, and they may be implemented using an advanced process and/or an object oriented programming language, and/or an assembly/machine language. The terms "machine-readable medium" and "computer-readable medium" used in the context may refer to any computer program products, devices and/or devices (e.g., magnetic disc, optical disc, memory or programmable logic device (PLD)) capable of providing the machine instructions and/or data to the programmable processor, including a machine-readable medium that receives a machine instruction as a machine-readable signal. The term "machine-readable signal" may refer to any signal through which the machine instructions and/or data are provided to the programmable processor.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server may be a cloud server, also called as cloud computing server or cloud server, which is a host product in a cloud calculating service system, so as to overcome such defects as large management difficulty and insufficient service extensibility in a conventional physical host and a Virtual Private Server (VPS).

In the embodiments of the present disclosure, the distribution probability of each human body 3D key point in the predetermined space may be outputted in the form of the 3D heatmap, and the human body 3D key point may be determined in accordance with the 3D heatmap. As a result, it is able to prevent the occurrence of an error for the detection of the human body 3D key point caused by an existing deep learning model where 2D coordinate values and depth information are outputted separately, thereby to remarkably improve the accuracy of the human body 3D key point detection. Hence, according to the embodiments of the present disclosure, it is able to solve the problem that there is a large error for the human body 3D key point detection technology.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A human body three-dimensional (3D) key point detection method, comprising:
acquiring a to-be-detected image, the to-be-detected image comprising first human body image data;
inputting the to-be-detected image into a key point extraction model to acquire N first 3D heatmaps about N human body 3D key points in the first human body image data, each first 3D heatmap representing a Gaussian distribution of one human body 3D key point in first human body image data in a predetermined space, wherein N is a positive integer; and
determining coordinate information of the N human body 3D key points in the first human body image data based on the N first 3D heatmaps,
wherein the N human body 3D key points comprise a target human 3D key point, and the determining the coordinate information of the N human body 3D key points in the first human body image data based on the N first 3D heatmaps comprises:
with respect to a target coordinate dimension in three coordinate dimensions for the target human body 3D key point, calculating an average of values of data on a two-dimensional plane corresponding to the target coordinate dimension in the first 3D heatmap corresponding to the target human body 3D key point, to acquire a plurality of coordinate candidates on the target coordinate dimension, the two-dimensional plane corresponding to the target coordinate dimension being a plane determined in accordance with other two coordinate dimensions in the three coordinate dimensions; and
determining a maximum coordinate candidate in the plurality of coordinate candidates on the target coordinate dimension as a coordinate value of the target human body 3D key point on the target coordinate dimension, the coordinate information about the target human body 3D key point comprising coordinate values of the target human body 3D key point on the three coordinate dimensions, wherein the target human body 3D key point is any human body 3D key point in the N human body 3D key points, and the target coordinate dimension is any coordinate dimension in the three coordinate dimensions.

2. The human body 3D key point detection method according to claim 1, wherein the inputting the to-be-detected image into the key point extraction model to acquire the N first 3D heatmaps about the N human body 3D key points in the first human body image data comprises:

inputting the to-be-detected image into the key point extraction model so that the key point extraction model outputs N second 3D heatmaps of the N human body 3D key points, a space for each second 3D heatmap being the predetermined space; and with respect to each second 3D heatmap, normalizing data in the second 3D heatmap to acquire the N first 3D heatmaps.

3. A model training method, comprising:

acquiring a plurality of training images, each training image comprising second human body image data;

inputting each training image of the plurality of training images into a key point extraction model to acquire N third three-dimensional (3D) heatmaps of N human body 3D key points in the second human body image data, each third 3D heatmap representing a Gaussian distribution of one human body 3D key point in the second human body image data in a predetermined space, wherein N is a positive integer;

determining coordinate information of the N human body 3D key points in the second human body image data based on the N third 3D heatmaps;

determining difference information between the coordinate information of the N human body 3D key points in the second human body image data and coordinate label information corresponding to the second human body image data; and updating the key point extraction model based on the difference information;

wherein the N human body 3D key points comprise a target human body 3D key point, and the determining the coordinate information of the N human body 3D key points in the second human body image data based on the N third 3D heatmaps comprises:

with respect to a target coordinate dimension in three coordinate dimensions for the target human body 3D key point, calculating an average of values of data on a two-dimensional plane corresponding to the target coordinate dimension in the first 3D heatmap corresponding to the target human body 3D key point, to acquire a plurality of coordinate candidates on the target coordinate dimension, the two-dimensional plane corresponding to the target coordinate dimension being a plane determined in accordance with other two coordinate dimensions in the three coordinate dimensions; and determining a maximum coordinate candidate in the plurality of coordinate candidates on the target coordinate dimension as a coordinate value of the target human body 3D key point on the target coordinate dimension, the coordinate information about the target human body 3D key point comprising coordinate values of the target human body 3D key point on the three coordinate dimensions, wherein the target human body 3D key point is any human body 3D key point in the N human body 3D key points, and the target coordinate dimension is any coordinate dimension in the three coordinate dimensions.

4. The model training method according to claim 3, wherein the acquiring the plurality of training images comprises:

acquiring a plurality of target training images; and performing data enhancement on the plurality of target training images to acquire the plurality of training images.

5. An electronic device, comprising at least one processor and a memory in communication with the at least one processor, wherein the memory is configured to store therein an instruction to be executed by the at least one processor, and the at least one processor is configured to execute the instruction so as to implement the human body 3D key point detection method according to claim 1.

6. The electronic device according to claim 5, wherein the inputting the to-be-detected image into the key point extraction model to acquire the N first 3D heatmaps about the N human body 3D key points in the first human body image data comprises:

inputting the to-be-detected image into the key point extraction model so that the key point extraction model outputs N second 3D heatmaps of the N human body 3D key points, a space for each second 3D heatmap being the predetermined space; and with respect to each second 3D heatmap, normalizing data in the second 3D heatmap to acquire the N first 3D heatmaps.

7. An electronic device, comprising at least one processor and a memory in communication with the at least one processor, wherein the memory is configured to store therein an instruction to be executed by the at least one processor, and the at least one processor is configured to execute the instruction so as to implement the model training method according to claim 3.

8. The electronic device according to claim 7, wherein the acquiring the plurality of training images comprises:

acquiring a plurality of target training images; and performing data enhancement on the plurality of target training images to acquire the plurality of training images.

9. A non-transient computer-readable storage medium storing therein a computer instruction, wherein the computer instruction is executed by a computer so as to implement the human body 3D key point detection method according to claim 1.

10. The non-transient computer-readable storage medium according to claim 9, wherein the inputting the to-be-detected image into the key point extraction model to acquire the N first 3D heatmaps about the N human body 3D key points in the first human body image data comprises:

inputting the to-be-detected image into the key point extraction model so that the key point extraction model outputs N second 3D heatmaps of the N human body 3D key points, a space for each second 3D heatmap being the predetermined space; and with respect to each second 3D heatmap, normalizing data in the second 3D heatmap to acquire the N first 3D heatmaps.

11. A non-transient computer-readable storage medium storing therein a computer instruction, wherein the computer instruction is executed by a computer so as to implement the model training method according to claim 3.

12. The non-transient computer-readable storage medium according to claim 11, wherein the acquiring the plurality of training images comprises:
   acquiring a plurality of target training images; and
   performing data enhancement on the plurality of target training images to acquire the plurality of training images.

\* \* \* \* \*